(12) United States Patent
Kremmer et al.

(10) Patent No.: US 11,388,852 B2
(45) Date of Patent: Jul. 19, 2022

(54) SYSTEM AND METHOD FOR CONTROLLING AN IMPLEMENT CONNECTED TO A VEHICLE

(71) Applicant: Deere & Company, Moline, IL (US)

(72) Inventors: Martin Kremmer, Laumersheim (DE);
Tobias Schaefer, Obermoschel (DE);
Akira Mizushima, West Des Moines, IA (US); Matthias Meyer, Kaiserslautern (DE)

(73) Assignee: Deere & Company, Moline, IL (US)

( * ) Notice: Subject to any disclaimer, the term of this patent is extended or adjusted under 35 U.S.C. 154(b) by 412 days.

(21) Appl. No.: 16/664,413

(22) Filed: Oct. 25, 2019

(65) Prior Publication Data

US 2020/0236833 A1 Jul. 30, 2020

Related U.S. Application Data

(60) Provisional application No. 62/796,756, filed on Jan. 25, 2019.

(51) Int. Cl.
*A01B 63/02* (2006.01)
*A01B 63/10* (2006.01)
*A01B 63/00* (2006.01)

(52) U.S. Cl.
CPC ............ *A01B 63/023* (2013.01); *A01B 63/10* (2013.01); *A01B 63/004* (2013.01)

(58) Field of Classification Search
CPC ..... A01B 63/025; A01B 63/10; A01B 63/004; A01B 63/002
See application file for complete search history.

(56) References Cited

U.S. PATENT DOCUMENTS

| 5,857,539 | A | 1/1999 | Diekhans et al. |
| 6,443,236 | B2* | 9/2002 | Staude ................. A01B 59/068 |
| | | | 172/439 |
| 9,904,290 | B2* | 2/2018 | Pickett ................. G05D 1/0287 |

(Continued)

FOREIGN PATENT DOCUMENTS

| DE | 102009041646 A1 | 3/2011 |
| DE | 102015009889 A1 | 2/2017 |

(Continued)

OTHER PUBLICATIONS

European Search Report issued in counterpart application No. 19213327.0 dated Jun. 5, 2020 (09 pages).

(Continued)

*Primary Examiner* — Jamie L McGowan

(57) ABSTRACT

A system and method for controlling an agricultural implement connected to a vehicle. An actuator is arranged to control a lateral position of the implement with respect to the vehicle, also influencing the vertical angle of the implement. A camera mounted on the implement is connected to an image processing system which is adapted to derive the position of at least one row of plants in an image provided by the camera. An implement control unit controls the actuator to move the implement to a desired position based upon the derived position of the at least one row of plants, and a compensation arrangement compensates for the rotation of the camera around the vertical axis caused by the actuator based on the position of the actuator.

7 Claims, 3 Drawing Sheets

(56) References Cited

U.S. PATENT DOCUMENTS

| | | | |
|---|---|---|---|
| 2002/0193928 A1 | 12/2002 | Beck | |
| 2013/0110358 A1 | 5/2013 | Merx et al. | |
| 2013/0186657 A1* | 7/2013 | Kormann | A01B 69/004 172/278 |
| 2018/0242517 A1* | 8/2018 | Davis | A01B 69/001 |
| 2018/0243771 A1* | 8/2018 | Davis | G05D 1/0278 |
| 2018/0243772 A1* | 8/2018 | Davis | G05D 1/0278 |
| 2018/0243773 A1* | 8/2018 | Davis | A01C 23/007 |
| 2018/0243774 A1* | 8/2018 | Davis | H04N 5/2253 |
| 2020/0073389 A1* | 3/2020 | Flajolet | A01B 63/1112 |
| 2020/0236833 A1* | 7/2020 | Kremmer | A01B 63/10 |
| 2020/0288621 A1* | 9/2020 | Kremmer | A01B 69/004 |

FOREIGN PATENT DOCUMENTS

| | | |
|---|---|---|
| DE | 102016212201 A1 | 1/2018 |
| DE | 102017113726 A1 | 12/2018 |
| EP | 1210854 A1 | 6/2002 |
| EP | 1475609 A2 | 11/2004 |
| EP | 2283719 A2 | 2/2011 |
| EP | 2316259 A1 | 5/2011 |
| EP | 2910098 A1 | 8/2015 |
| EP | 3170380 A1 | 5/2017 |
| EP | 3571913 A1 | 11/2019 |
| WO | 2008005195 A2 | 1/2008 |
| WO | WO2018206678 A1 | 11/2018 |

OTHER PUBLICATIONS

English, A., et al. Vision Based Guidance for Robot Navigation in Agriculture. 2014 IEEE International Conference on Robotics & Automation, May 31-Jun. 7, 2014, pp. 1693-1698 [online], [retrieved on Sep. 23, 2019]. Retrieved from the Internet: <URL: https://ieeexplore.ieee.org/abstract/document/6907079> <DOI: 10.1109/ICRA.2014.6907079>.

Zhang, Q., et al. Agricultural Vehicle Navigation Using Multiple Guidance Sensors. In Proceedings of the International Conference on Field and Service Robotics, Aug. 1999, pp. 107-112 [online], [retrieved Sep. 23, 2019]. Retrieved from the Internet: <URL: http://www8.cs.umu.se/research/ifor/dl/LOCALIZATION-NAVIGATION/agricultural%20vehicle%20navigation.pdf>.

* cited by examiner

SYSTEM AND METHOD FOR CONTROLLING AN IMPLEMENT CONNECTED TO A VEHICLE

TECHNICAL FIELD

This invention relates generally to agricultural vehicles. More particularly it relates to a vehicle with an implement for agricultural purposes and a method for controlling the implement during work on a field.

BACKGROUND

A number of agricultural operations require that an implement is guided along a nominal path, such that the operation performed by the implement is performed at a desired location. Such a location can be a place where a seed particle is to be sown (with a seeding or drill machine) or where a plant growing in the field is to be fertilized (with a spreader or sprayer) or where weed is to be hoed (with a cultivator) or sprayed (with a sprayer). Normally, such implements are moved by a vehicle over the field. The vehicle and/or the implement can be provided with a location determining apparatus, like a global navigation satellite system (GNSS) receiver or a camera with an image processing system recognizing features in the field, in particular plant rows. The implement can be supported on the vehicle or towed behind the vehicle.

For applications in which a relatively high precision is required, like for example for hoeing to remove weeds from a field, without damaging the plants, it was proposed to steer the vehicle on a desired path (based on a camera or GNSS receiver) and to control an actuator adapted for a lateral adjustment of the implement with respect to the vehicle (also based on a camera or GNSS receiver) to keep the implement on the desired path, thus compensating possible steering errors of the vehicle. In some embodiments, the implement is only moving in the direction transversely to the longitudinal axis of the vehicle (for example shown in EP 2283719 A2, US 2013/0110358 A1, DE 102017113726 A1) since the implement is supported in a sliding manner on the vehicle, while in other embodiments, the lateral movement of the implement is also involving a certain rotation of the implement around the vertical axis, in particular if the actuator moves a lower link of a three-point hitch (cf DE 102015009889 A1, DE 102016212201 A1).

The actuator thus controls the lateral position of the implement and of its tools. If the implement is moved only laterally with respect to the vehicle by the actuator, the signals provided by an implement-mounted camera can be used for determining the position of the existing plant rows in the field with respect to the camera and to derive therefrom a signal for lateral adjustment of the implement, without any correction for the orientation of the implement and camera around the vertical axis. However, in embodiments in which the actuator affects not only a lateral implement movement, but also the mentioned rotation of the implement and hence camera around the vertical axis, the camera orientation around the vertical axis varies as the actuator is moving. In the prior art, the camera guidance is made independent from the camera orientation by positioning the camera exactly above the plant rows and extrapolating the row direction to the location of the camera. Thus, the angle of the camera around the vertical axis is not influencing the extrapolated row direction, but this extrapolated row direction is not always sufficiently exact, since plants may not have been planted at the intended location or are not growing symmetrically, thus leading to possible noise in the actuator signal and thus errors in lateral guidance. The present disclosure attempts to mitigate these disadvantages.

SUMMARY

Various aspects of examples of the present disclosure are set out in the claims.

According to a first aspect of the present disclosure, a system for controlling an implement connected to a vehicle can include an actuator, at least one camera, an implement control unit, and a compensation arrangement. The implement is adapted to perform an agricultural operation on a field. The actuator is arranged to control a lateral position of the implement with respect to the vehicle, whereby the implement is mounted to the vehicle in a manner such that lateral adjustment of the implement affected by the actuator also influences the angle of the implement with respect to the vehicle around a vertical axis. The at least one camera is mounted on the implement and connected to an image processing system which is adapted to derive the position of at least one row of plants in an image provided by the camera. The implement control unit is adapted to control the actuator to move the implement to a desired position based upon the derived position of the at least one row of plants. The compensation arrangement is arranged to compensate for the rotation of the camera around the vertical axis caused by the actuator.

The vehicle can have a chassis connected to the implement by a three-point hitch with two lower links and an upper link, where the actuator is arranged to move one of the lower links around a vertical axis. It is also possible that the vehicle has a chassis connected to the implement by a tongue and the implement is supported on at least one wheel, with the actuator arranged to move at least one of the wheel and the tongue around a vertical axis.

The compensation arrangement can comprise a mechanical connection between the actuator and the camera.

The compensation arrangement can comprise a sensor adapted to sense the angle of the implement with respect to the vehicle around the vertical axis, where the sensor is connected to the implement control unit.

The implement control unit can be adapted to transform one of the derived position of the at least one row of plants and a nominal position of plants in the image to a corrected position based upon the sensed angle and to control the actuator based upon the corrected position.

The implement control unit can be adapted to transform one of the derived position of the at least one row of plants and a nominal position of plants in the image to a corrected position based upon an orientation of the row of plants derived from the image provided by the camera and to control the actuator based upon the corrected position.

The implement control unit can be adapted to control a motor controlling the position of the camera around the vertical axis based upon the signal of the sensor or an orientation of the row of plants derived from the image provided by the camera.

The sensor can be adapted to sense at least one of the position of the actuator and the position of one of the lower links of the three-point hitch.

According to second aspect of the present disclosure, a method of controlling an implement connected to a vehicle is provided, where the implement performs an agricultural operation on a field and an actuator controls a lateral position of the implement with respect to the vehicle. The implement is mounted to the vehicle in a manner such that lateral adjustment of the implement affected by the actuator also influences the angle of the implement with respect to the vehicle around a vertical axis. At least one camera mounted on the implement is connected to an image processing system which derives the position of at least one row of plants in an image provided by the camera. An implement control unit controls the actuator to move the implement to a desired position based upon the derived position of the at least one row of plants. A compensation arrangement compensates for the rotation of the camera around the vertical axis caused by the actuator.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 5 of the drawings.

Figure 1:
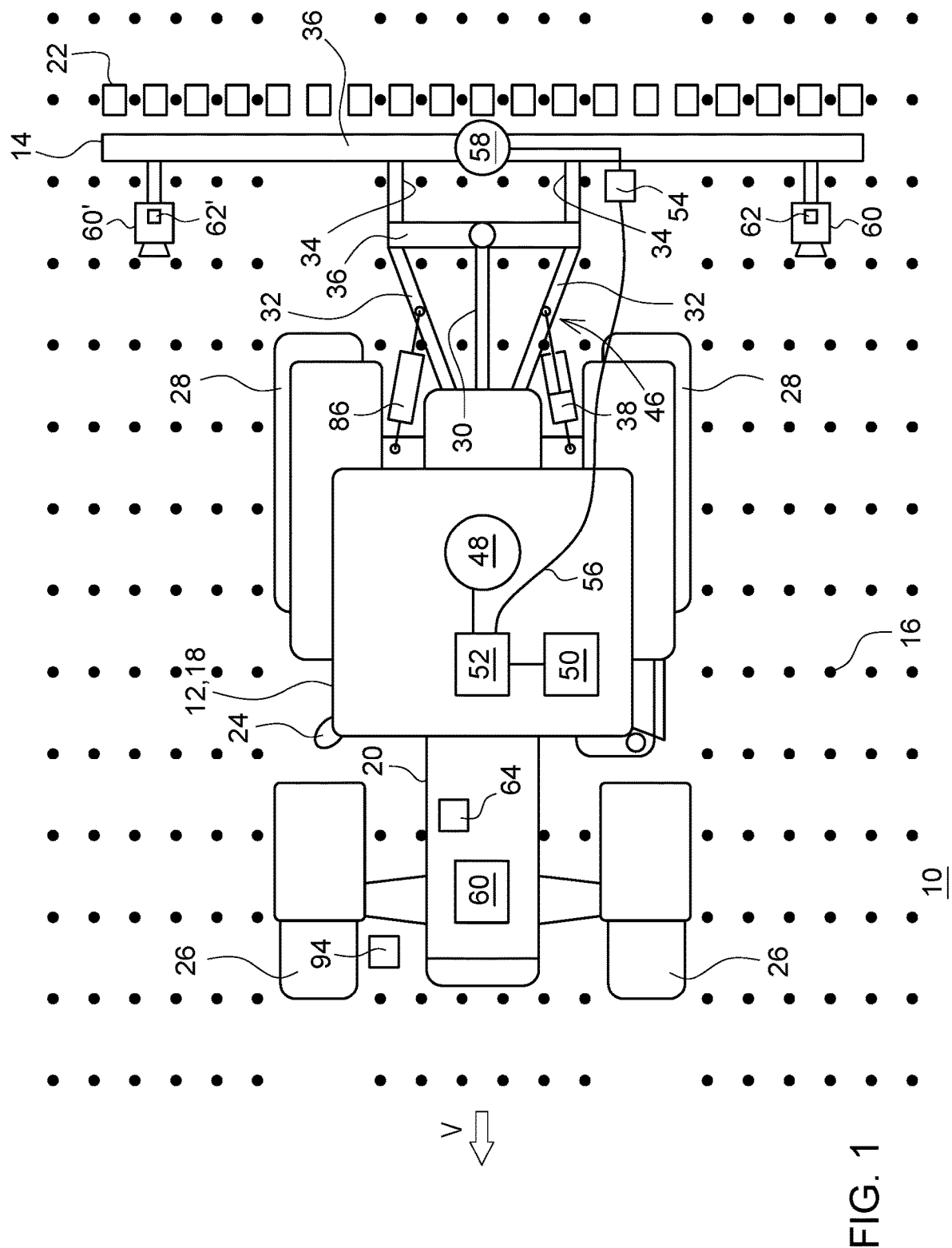
FIG. 1 is a schematic top view of an agricultural vehicle with an implement and a system for controlling the lateral position of the implement during a cultivation operation on a field.

FIG. 1 shows a top view of a field 10 on which an agricultural vehicle 12, comprising a self-propelled vehicle and an implement 14 connected thereto, is operating. On the field 10, plants 16 have been planted or sown during a previous work step. The plants 16 are planted in a rectangular pattern, as shown, or any other possible pattern, for example in a hexagonal or diamond-shaped pattern. The plants 16 can be sown or planted in any useful manner, like based on a positioning system (for example, GPS) receiver or using local sensors on the seeding or planting vehicle.

The vehicle 12 is a tractor 18 with a chassis 20 or frame supported on ground engaging means in the form of steerable front wheels 26 and driven rear wheels 28. The vehicle 12 also comprises an operator cab 24 and an engine 61 for driving the rear wheels 28 and optionally the front wheels 26 and a PTO (not shown).

Implement 14 comprises a cross beam 36 supporting a number of row units 22 distributed side by side along the length of the cross beam 36. The row units 22 are performing an agricultural operation on the field 10. In the embodiment shown, the row units 22 can be hoes for weeding or spraying device for feeding the plants 16. In the embodiment shown, between each row of plants 16, seen in the forward direction V of the vehicle 12 (which extends in FIG. 1 to the left), one row unit 22 is provided, also it would be possible to have a row unit 22 only between two adjacent rows and the space between the next two rows is without a row unit 22, or two row units 22 are assigned to a single row of plants 16 and thus interact from both sides of the plants. In other embodiments, the row units 22 can be seeding units for depositing seed or plants in the ground in a desired pattern.

On the rear of the chassis 20, a three-point hitch 46 with lower links 32 and an upper link 30 is mounted. The links 30, 32 are connected at their rear ends to a transverse support bar 36, which on its end is connected by longitudinal bars 34 to the cross beam 36 of the implement 14. The links 30 and 32 are pivotally mounted around vertical axes to the chassis 20 and to the transverse support bar 36. An actuator 38 in the form of a hydraulic cylinder is connected with its first end to the chassis 20 and with its second end to the lower links 32, respectively, and can thus move the transverse support bar 36 and hence the entire implement 14 in a parallelogram-wise manner in a lateral direction (extending horizontally and transversely to the forward direction V). The actuator 38 is controlled by a valve block 50 which is connected to an electronic vehicle control unit 52. The electronic vehicle control unit 52 is adapted to receive control signal via a bus system 56 (preferably operating according to standard ISO 11783) which transmits control commands from an electronic implement control unit 54 to the vehicle control unit 52. The implement control unit 54 thus can control the lateral position of the implement 14. This is described in more detail in DE 102016212201 A1, the contents of which are incorporated herein by reference. A sensor 86 detects the angle of one of the lower links 32 with respect to the chassis 20 around the vertical axis and thus provides a signal regarding the lateral position of the implement 14 with respect to chassis 20. It should be mentioned that the sensor 86 can be a separate sensor, or (indicated as 86') could be integrated into the housing of actuator 38 (cf EP 1210854 A1). In another embodiment, actuators 38 could be used between the chassis 20 and each lower link 32, with integrated or separate sensors 86, wherein the actuators are double or single acting.

In another possible embodiment, it would be possible to support the implement 14 on wheels and connect it to a hitch of the vehicle 12 by a tongue and to have at least one actuator 38 actively control the angle of the tongue and/or to control the steering angle of the wheels of the implement by the actuator (cf US 2013/0186657 A1, the contents of which are incorporated herein by reference).

Thus, the lateral position of the implement 14 is controlled by the implement control unit 54 using the actuator 38. Since the implement 14 should always move over the field 10 at a lateral position where the row units 22 are located at their appropriate positions between the rows of plants 16 in order to provide the desired agricultural operation and avoid damage to the plants (or in any useful nominal position useful to perform an agricultural operation, like seeding, planting, nursing or harvesting the plants), the implement control unit 54 is automatically guided along the rows of plants 16, based on signals of a first camera 60 with an image processing system 62, an optional second camera 60' with an image processing system 62' and an optional receiver 58 for receiving signals of a satellite-based positioning system, like GPS, Glonass, or Galileo. The receiver 58 is mounted on the cross beam 36 of the implement 14. The image processing systems 62 could also be integrated into the implement control unit 54. In another embodiment, the implement control unit 54 could also be incorporated in the vehicle control unit 52.

The cameras 60, 60' are mounted on the cross beam 36 of the implement 14 and look onto the field 10 in front of the implement. The image processing systems 62, 62' extract from the images the relative position of the rows of plants 16 with respect to the camera 60, 60' and compare this position with a pre-stored or programmed nominal (desired) position of the plants. Thus, a signal is provided to the implement control unit 54 indicating a possible deviation between the actual lateral position and the nominal lateral position of the implement 14. The signals from the image processing systems 62, 62' can be augmented by signals from the receiver 58, using a pre-stored map with the location of the plants 16 as reference. Fusing the signals from image processing systems 62, 62' and receiver 58 can be based on the relative quality of the signals, as described for example in US 2002/0193928 A1 and EP 2910098 A1, the contents of both incorporated herein by reference.

Thus, as mentioned, the implement control unit 54 controls the actuator 38 to have the implement 14 and its row units 22 based on the first signal to have the implement 14 moving along a nominal path. In the shown embodiment, this nominal path is defined by the position of the plants 16 on the field and actuator 38 is controlled by the implement control unit 54 (using appropriate software) based on the signals from cameras 60 and/or 60' and optionally from the receiver 58 such that the row units 22 move between the plants 16 (according to the position of the plants as detected by the camera(s) 60, 60').

The front wheels 26 of the vehicle 12 can be steered manually by an operator of vehicle 12 in a conventional manner or the vehicle control unit 52 controls a steering actuator 64 influencing the steering angle of the front wheels 26 based upon signals from a positioning system with a receiver 48 for receiving signals of a satellite-based positioning system, like GPS, Glonass, or Galileo, using a pre-stored map with the location of the plants 16 or a path (tramline) to drive over the field 10 as reference. The receiver 48, optionally incorporating an inertial measuring unit (IMU), as described in EP 1475609 A2, is mounted on the roof of cab 24. Alternatively or additionally, the vehicle 12 can be steered based upon a camera (not shown) mounted on the vehicle 12 with an image processing system detecting the rows of plants 16 in front of the vehicle. It should also be mentioned that in case of a track-based vehicle 12, the steering angle thereof could be influenced by speed differences of the tracks on both sides of the vehicle 12, and in case of articulated steering, an actuator would control the steering angle of vehicle 12 by rotating the front and rear parts of the vehicle 12 around a joint.

Figure 2:
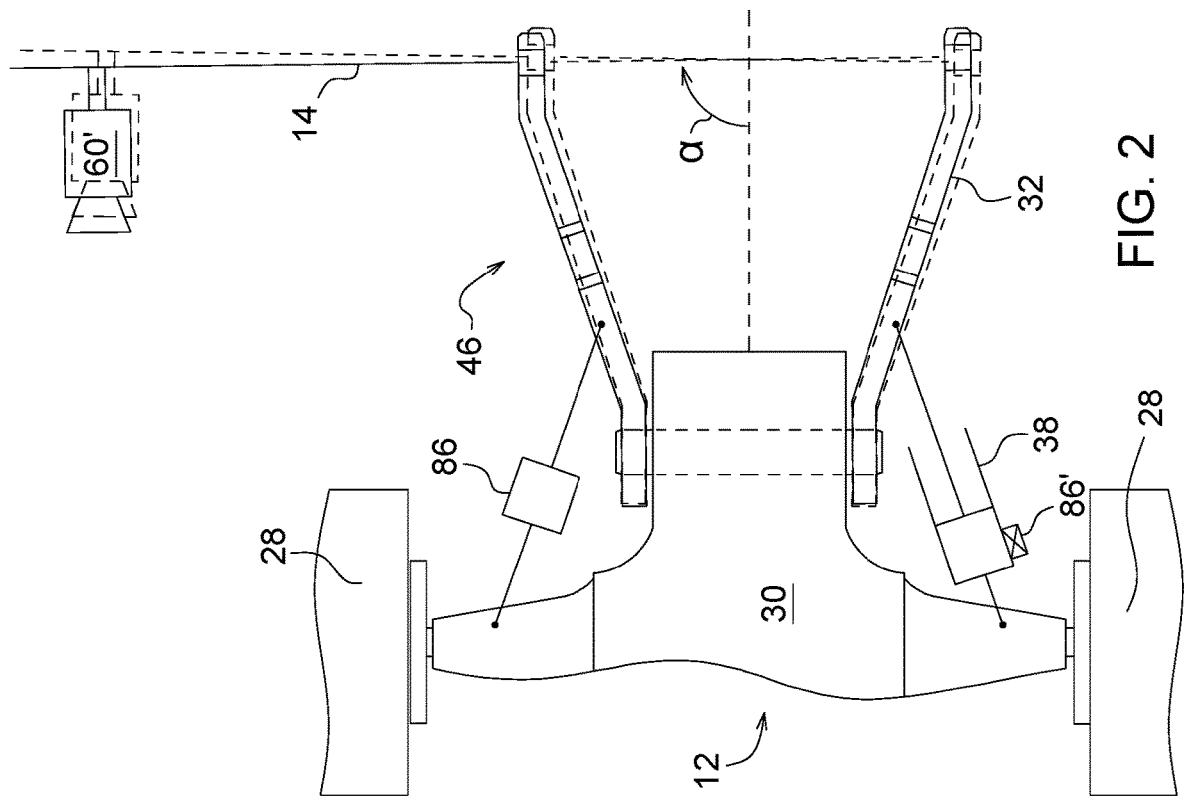
FIG. 2 is a schematic top view of the connection between the implement and the vehicle.

FIG. 2 shows the connection between the chassis 30 and the implement 14 in an enlarged top view, as described generally in DE 102015009889 A1 and DE 102016212201 A1. Actuator 38 moves the left lower link 32 and thus also the implement 14 in a lateral direction (transversely to the forward direction V of vehicle 12) by pivoting it by a certain amount around the vertical axis with respect to the chassis 30. This also affects the orientation of implement 14 around the vertical axis (angle α in FIG. 2). It is apparent that this angle also affects the position and orientation of cameras 60, 60'. Without any correction for this angle α, the image processing systems 62, 62' and the implement control unit 54 would not correctly control the actuator 38, since it would control the implement 14 to move into an incorrect nominal position because the angle α of the camera 60 and/or 60' around the vertical axis is not always 90°, as normally presumed by the implement control unit 54.

Figure 3:
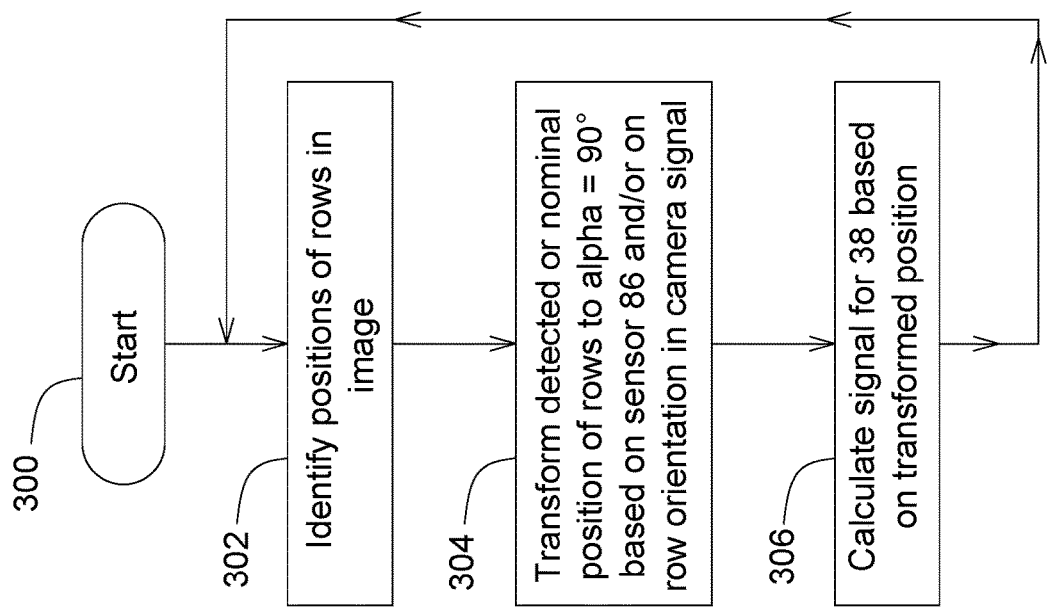
FIG. 3 is a flow diagram indicating the operation of the implement control unit for controlling the actuator influencing the lateral position of the implement according to a first embodiment, compensating for the angle error caused by the actuator.

The implement control unit 54 works as indicated in FIG. 3. After start in step 300, the image processing system(s) 62 and/or 62' identify in step 302 the position of one or more rows of plants in the image signals provided by the camera 60, 60'. This can be done in any manner known in the art, as described for example in A. English et al, Vision Based Guidance for Robot Navigation in Agriculture, 2014 IEEE International Conference on Robotics & Automation (ICRA), Hong Kong Convention and Exhibition Center, May 31-Jun. 7, 2014. Hong Kong, China, p. 1693-1698 or Q. Zhang et al, Agricultural Vehicle Navigation Using Multiple Guidance Sensors, In Proceedings of the Int. Conf on Field and Service Robotics, 1999 (retrieved from the internet at http://www8.cs.umu.se/research/ifor/dl/LOCAL-IZATION-NAVIGATION/agricultural%20vehicle%20navigation.pdf on 2. Nov. 2018).

In the next step 304, the implement control unit 54 receives the signals regarding the row position from the image processing system(s) 62 and/or 62' and from sensor 86 and/or 86'. The implement control unit 54 uses the signal of sensor 86 and/or 86' to transform the detected position of the one or more rows (from step 302) to a transformed position which corresponds to an angle α of 90°. Thus, if the angle α is larger than 90°, the camera 60 and/or 60' looks not forward, but to the right and hence the row positions are rotated by the portion of the angle α exceeding 90° to the left. Analogously, if the angle α is smaller than 90°, the camera 60 and/or 60' looks not forward, but to the left and hence the row positions are rotated by the portion of the angle α falling below 90° to the right. This operation can be performed to the raw images in the image processing systems 62, 62' (step 302) or to the row positions (step 304). These row positions are needed for the following step 306, in which a possible difference between the detected and the nominal (intended) row positions for the rows (i.e., the positions were the rows should be in the image in order to achieve that the implement 14 is located at the desired lateral position to perform the intended agricultural task without damaging the plants) is calculated. This difference can be calculated for a certain position on the field in front of the implement 14, which may be in the order of 1 m ahead of the camera 60, 60', and thus of the implement 14 to provide sufficiently reaction time.

In another embodiment, the implement control unit 54 in step 304 does not shift the detected row positions or the raw images to the left or right to perform the described transformation for correcting the error due to α deviating from 90°, but laterally shifts the nominal (intended) row positions in the opposite direction to correct the mentioned error.

In a further embodiment, the sensor 86, 86' can be omitted. Instead of using the signal of sensor 86, 86', the implement control unit 54 uses the orientation of one or more rows of plants 16 provided by the camera 60, 60' and the image processing system 62, 62' to determine the angle α. Since the rows of plants 16 have presumably been planted in a straight line, the row orientation contains information on the orientation of the implement 14 (and thus of camera 60, 60') around the vertical angle α. This information on angle α is thus derived in step 304 from the signals of the image processing systems 62, 62' and used to perform the correction as described in the two preceding paragraphs. It would also be possible to fuse the signal from sensor 86, 86' with the orientation determined based upon the mentioned row orientation detected by image processing system 62, 62'.

Finally, in step 306 the implement control unit 54 calculates a signal for the actuator 38 and submits it to the actuator 38 via the vehicle control unit 52 and valve block 50. This signal is calculated based on the difference between the detected row positions and the nominal row positions, at least one of which transformed to the corrected value in step 304.

Hence, the correction of the mentioned error caused by the movement of the implement 14 and thus the cameras 60, 60' due to the movement of actuator 38 is not based on an extrapolation of the rows detected in the images of the cameras 60, 60' to the location of the camera 60, 60', what involves certain uncertainties and errors for example due to plants not growing at their exact intended location or growing unsymmetrically, but on the signals of sensor 86 or to one or more rows of plants detected in the images provided by the cameras 60, 60', which involve less inaccuracy and thus improves the precision of implement guidance.

Figure 4:
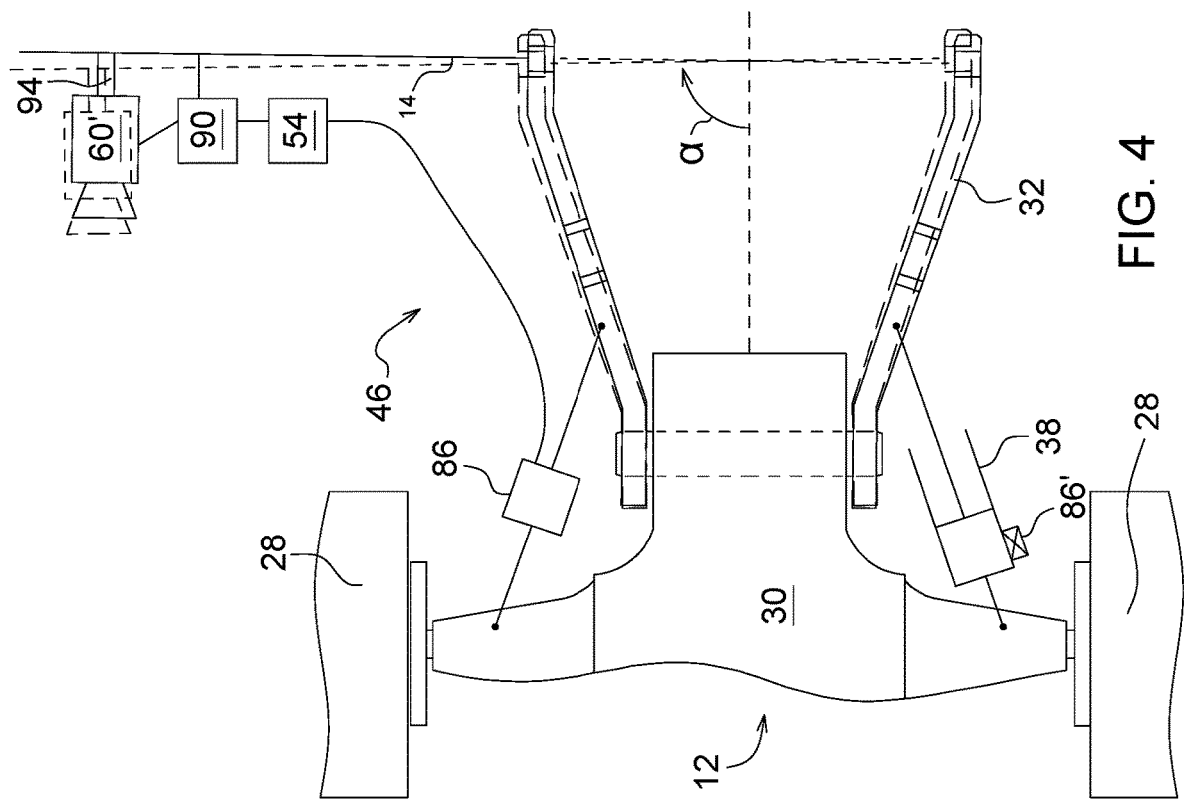
FIG. 4 is a schematic top view of the connection between the implement and the vehicle, with a second embodiment of a compensation arrangement for the angle error caused by the actuator.

In the embodiment of FIG. 4, the image signals of the camera 60, 60' are not corrected by the implement control unit 54, but instead the angular orientation of the cameras 60, 60'. The implement control unit 54 receives the signal from sensor 86 and/or 86' (or uses the orientation of the rows of plants 16 derived from the signals of camera 60, 60' by the image processing systems 62, 62' as described above) and controls a motor 90 rotating the camera 60 and/or 60' around a vertical axis 94 with respect to the implement 14. Thus, the camera 60 and/or 60' is rotated such that it is always exactly looking in the forward direction, thus compensating for the error caused by the angle α.

Figure 5:
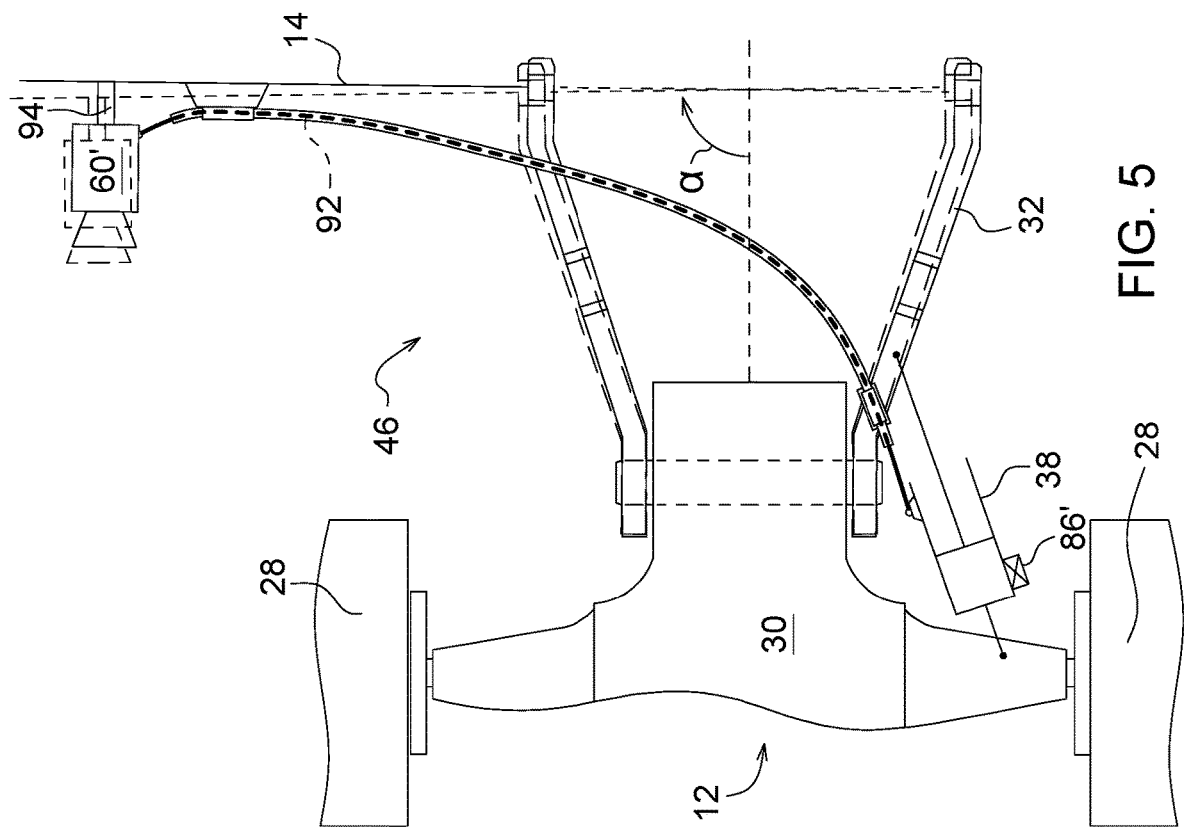
FIG. 5 is a schematic top view of the connection between the implement and the vehicle, with a third embodiment of a compensation arrangement for the angle error caused by the actuator.

In the embodiment of FIG. 5, the electromechanical connection between the actuator 38 and the camera 60, 60' as shown in FIG. 4 is replaced with a mechanical connection comprising a Bowden cable 92 with an interior wire coupled to the part of the actuator 38 coupled to the vehicle 12 and to the camera 60, 60' and a housing coupled to the lower link 32. Thus, when the actuator 38 moves the implement 14 laterally and adjusts the vertical angle α, the camera 60, 60' is rotated such that it is always exactly looking in the forward direction, thus compensating for the error caused by the angle α).

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A system for controlling an implement connected to a vehicle comprising:
the implement adapted to perform an agricultural operation on a field; an actuator arranged to control a lateral position of the implement with respect to the vehicle, whereby the implement is mounted to the vehicle in a manner such that lateral adjustment of the implement affected by the actuator also influences an angle of the implement with respect to the vehicle around a vertical axis;
at least one camera mounted on the implement and connected to an image processing system which is adapted to derive a position of at least one row of plants in an image provided by the at least one camera and compare the position with a pre-stored desired position of the row of plants;
an implement control unit adapted to control the actuator to move the implement to the desired position based upon the comparison of the derived position of the at least one row of plants and the pre-stored desired position of the row of plants; and
a compensation arrangement comprising a sensor configured to sense the angle of the implement with respect to the vehicle around the vertical axis, the sensor connected to the implement control unit, the compensation arrangement arranged to compensate for the rotation of the at least one camera around the vertical axis caused by the actuator.

2. The system of claim 1, wherein the vehicle has a chassis connected to the implement by a three-point hitch with two lower links and an upper link, the actuator arranged to move one of the lower links around a vertical axis.

3. The system of claim 1, wherein the vehicle has a chassis connected to the implement by a tongue and the implement is supported on at least one wheel, the actuator arranged to move at least one of the wheel and the tongue around a vertical axis.

4. The system of claim 1, wherein the compensation arrangement comprises a mechanical connection between the actuator and the at least one camera.

5. The system of claim 1, wherein the implement control unit is adapted to control a motor controlling the position of the at least one camera around the vertical axis based upon one of the signal of a sensor adapted to sense the angle of the implement with respect to the vehicle around the vertical axis and an orientation of the row of plants derived from the image provided by the at least one camera.

6. The system of claim 1, wherein the vehicle has a chassis connected to the implement by a three-point hitch with two lower links and an upper link, the actuator arranged to move one of the lower links around a vertical axis and the sensor is adapted to sense at least one of the position of the actuator and the position of one of the lower links.

7. A method of controlling an implement connected to a vehicle comprising:
performing an agricultural operation on a field with the implement;
controlling a lateral position of the implement with respect to the vehicle with an actuator, whereby the implement is mounted to the vehicle in a manner such that lateral adjustment of the implement affected by the actuator also influences the angle of the implement with respect to the vehicle around a vertical axis;
deriving, using an image processing system, the position of at least one row of plants in an image, the image provided by at least one camera mounted on the implement and connected to the image processing system;
comparing, using the image processing system, the position of the at least one row of plants with a pre-stored desired position of the row of plants;
controlling the actuator with an implement control unit to move the implement to the pre-stored desired position based upon the comparison of the derived position of the at least one row of plants and the pre-stored desired position of the row of plants; and
compensating for the rotation of the at least one camera around the vertical axis caused by the actuator with a compensation arrangement comprising a sensor configured to sense the angle of the implement with respect to the vehicle around the vertical axis, the sensor connected to the implement control unit.

* * * * *